United States Patent
Fan et al.

(10) Patent No.: US 7,263,374 B2
(45) Date of Patent: Aug. 28, 2007

(54) METHOD OF CHANGING THE SETTING OF MOBILE UNIT BY BROADCASTING MESSAGE

(75) Inventors: Yu-Fu Fan, Hsinchu (TW); In-Ga Chiu, Pingjhen (TW)

(73) Assignee: BENQ Corporation, Taoyuan Shien (TW)

( * ) Notice: Subject to any disclaimer, the term of this patent is extended or adjusted under 35 U.S.C. 154(b) by 147 days.

(21) Appl. No.: 11/030,853

(22) Filed: Jan. 7, 2005

(65) Prior Publication Data

US 2005/0153734 A1  Jul. 14, 2005

(30) Foreign Application Priority Data

Jan. 9, 2004  (TW) .............................. 93100614 A

(51) Int. Cl.
*H04Q 7/20* (2006.01)
(52) U.S. Cl. ................................. 455/456.4; 455/456.3
(58) Field of Classification Search ................ 370/389, 370/328; 455/41.2, 456.1, 456.2, 456.3, 455/456.4
See application file for complete search history.

(56) References Cited

U.S. PATENT DOCUMENTS

| | | | | |
|---|---|---|---|---|
| 6,961,579 | B2 * | 11/2005 | Inukai et al. | 455/456.4 |
| 7,039,425 | B1 * | 5/2006 | Mazawa et al. | 455/456.4 |
| 2003/0125014 | A1 * | 7/2003 | Inukai et al. | 455/410 |
| 2004/0255271 | A1 * | 12/2004 | Lim | 717/110 |
| 2004/0268215 | A1 * | 12/2004 | Trossen et al. | 715/500 |
| 2005/0079863 | A1 * | 4/2005 | Macaluso | 455/419 |
| 2005/0085263 | A1 * | 4/2005 | Kim et al. | 455/556.1 |
| 2005/0122435 | A1 * | 6/2005 | Yunoki | 348/725 |
| 2005/0190764 | A1 * | 9/2005 | Shell et al. | 370/389 |

FOREIGN PATENT DOCUMENTS

| | | |
|---|---|---|
| CN | 1268857 | 10/2000 |
| CN | 1270484 | 10/2000 |
| CN | 1272758 | 11/2000 |
| CN | 1309492 | 8/2001 |
| CN | 1426257 | 6/2003 |
| CN | 1428944 | 7/2003 |

* cited by examiner

*Primary Examiner*—Nick Corsaro
*Assistant Examiner*—Michael Faragalla
(74) *Attorney, Agent, or Firm*—Thomas, Kayden, Horstemeyer & Risley

(57) ABSTRACT

A method of changing the setting of mobile unit by broadcasting message is provided. Firstly, the broadcaster codes the setting information into an application program via message editing such. Then, the message is broadcasted to associated mobile units according to the numbering of the mobile unit. When the starting time is up, the original setting of the mobile unit will be shifted to a situational setting according to the setting information; whereas when the finishing time is up, the situational setting will be shifted back to the original setting and all previous settings will be restored. Lastly, the system terminal receives and writes the mobile phone information into a registry, then broadcasts the setting information to the mobile phone within the specific area, enabling the mobile phone to change relevant settings accordingly. Mobile phones outside the specific area cannot receive the broadcasting signal and will not be affected.

14 Claims, 1 Drawing Sheet

METHOD OF CHANGING THE SETTING OF MOBILE UNIT BY BROADCASTING MESSAGE

This application claims the benefit of Taiwan application Serial No. 93100614, filed Jan. 9, 2004, the subject matter of which is incorporated herein by reference.

BACKGROUND OF THE INVENTION

1. Field of the Invention

The invention relates in general to a method of changing the setting of mobile unit, and more particularly to a method of changing the setting of mobile unit by broadcasting message.

2. Description of the Related Art

In recent years, portable mobile units, such as mobile phones and PDA, have gained a great popularity and found a wide range of application. In order to adapt the mobile units to existing operating environment, users need to shift operatings mode of the mobile units to different settings according to different environments. Since the operating mode is normally shifted manually, it occurs quite often that the user did not shift to an appropriate setting or forgot to resume the original setting afterwards. The user is often vexed with the situations in which the mobile unit rings aloud when a silence setting is desired or fails to vibrate when a vibrating alert setting is desired. The user would feel very awkward when his or her mobile unit rings at a theater where a short film advising the audience to switch off their mobile units has just been displayed, rings at a classroom when everyone is concentrating on study, or rings during an important meeting with a client. Also, the user would feel upset to miss an important incoming call because the mobile unit is set at the vibrating alert setting during a noisy and crowded exhibition.

Despite the mobile phone is designed to incorporate human considerations as much as possible and has provided several setting options of the operating mode such as incoming call ringing setting, silence setting, and vibrating alert setting etc. Due to the features of manual operation, the abovementioned awkward episodes might happen unexpectedly. Some users like to change settings such as wallpaper, screen protection program, ring sound, etc. to depict their personal characteristics. However, these settings cannot be set as default settings automatically after downloading: manual operations are still required. In terms of convenience, there are a lot to be further improved.

SUMMARY OF THE INVENTION

It is therefore an object of the invention to provide a method of changing the setting of mobile unit by broadcasting message, so as to facilitate the operation of the mobile unit.

The invention achieves the above-identified object by providing a method of changing the setting of mobile unit by broadcasting message, wherein the method includes the following steps:

Firstly, the broadcaster encodes the setting information into an application program via message editing such as JAVA message or places the setting information in the header of service message. Next, the message is broadcasted to associated mobile units according to the numbering of the mobile unit. The setting information can include relevant settings regarding mode status, starting time, finishing time, attached image file, ring sound, short video, and so forth.

After receiving the setting information, the mobile unit uses supported functions to analyze the setting information. When it comes to the starting time, the original setting of the mobile unit will be shifted to a situational mode according to the setting information; whereas when it comes to finishing time, the situational mode will be shifted back to the original mode and all previous settings will be restored. The mobile phone is operating with situational setting when it in situational mode. The mobile phone is operating with original setting when it in original mode. In order to broadcast to random targets within a specific area, a low power transmitter can be used to transmit a broadcasting signal capable of covering the specific area. After receiving the broadcasting signal, a mobile phone within the specific area will transmit mobile phone information, for example a mobile phone number, to a specified mobile communication system. The system terminal receives and records the mobile phone information into a registry, then the system broadcasts the setting information to the mobile phones within the specific area according to the information written in the registry, enabling the mobile phones to change relevant settings according to the setting information. Mobile phones outside the specific area cannot receive the broadcasting signal and will not be affected.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
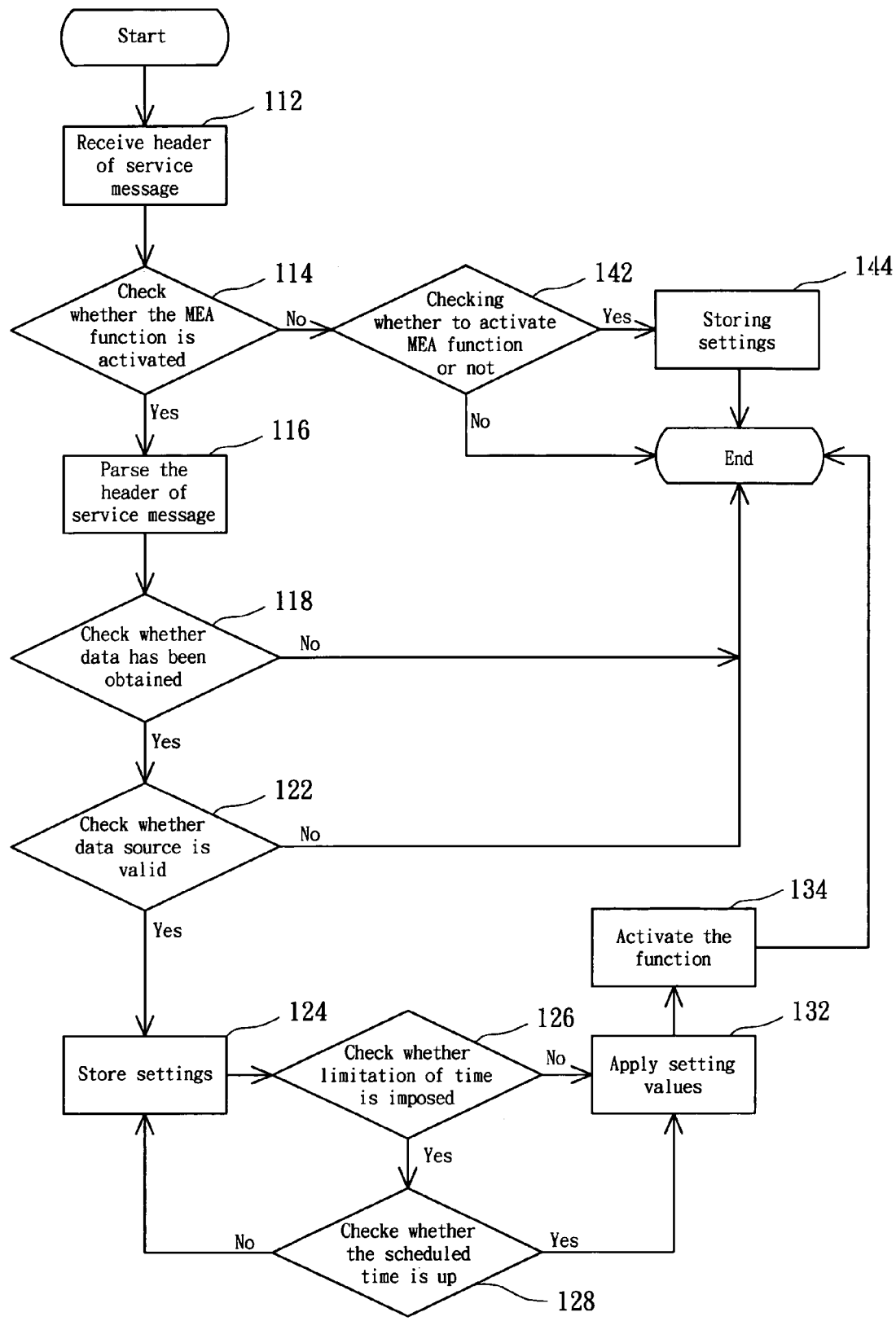
FIG. 1 is a flowchart of a method of changing the setting of mobile unit by broadcasting message according to a preferred embodiment of the invention.

The method according to a preferred embodiment of the invention uses message receiving function of a mobile unit (exemplified by a mobile phone here below) to automatically change the settings of the operating mode, wallpaper or ring sound by the broadcasting message sent by a broadcaster or the system terminal, enabling the mobile phone to automatically achieve situational settings most appropriate to existing situations. Although the mobile phone can change various settings automatically, the user is still able to change the settings via menu selection manually.

Take some practical situations for example. Before a conference starts, a manager can send setting information to all participants to automatically set the operating modes of their mobile phones to a conference setting mode and automatically resume their original setting when the conference is finished, wherein the setting information may be included in a service message, such as a short message service (SMS), an electronic message service (EMS), a multi-media message service (MMS) or an E-mail. In a movie theater, setting information can be broadcasted to the audience at the theater to shift the operating modes of their mobile phones to a silence setting. In a new album debut, the record company can broadcast setting information to the mobile phones on the site to display a wallpaper of the star of the album, play a song thereof or display an MTV film on the fans' mobile phones so as to achieve marvelous effect of advertisement. The user would find the operation of mobile phone more convenient, natural and entertaining. In practical application, the service provider determines the range of cell broadcast. Generally speaking, cordless system such as PHS covers a smaller area, while cellular system such as GSM can provide a small but precise cell broadcast service when integrated with precise positioning technology such as GPS. A number of typical applications of the invention are elaborated below.

In practical application, a user or system terminal can have setting information broadcasted to relevant people's mobile phones, so that the mobile phones can change the operating mode of the mobile phone from the original mode to a situational mode according to the setting information received. The original setting incoming call rings setting for instance, while the situational setting is a silence setting for instance. It is noteworthy that the setting information can be coded in a service message, or coded to a JAVA message using JAVA language. Take the application in the office for example. Before a conference, managers can broadcast the setting information to all participants. When participants' mobile phones receiving the setting information, the operating modes of the mobile phones are changed to a situational setting such as silence setting or vibrating alert setting according to the setting information. Furthermore, the setting information can include the items of starting time and finishing time. After receiving the setting information, the mobile phone stores the setting information in the calendar first. Then the mobile phone shifts the original setting to a situational setting when time comes to the starting time (the conference begins for instance) and resumes the original setting (the conference is finished for instance) and delete the setting information when the finishing time is up. Similarly, in the new album debut, the record companies can even broadcast setting information to the mobile phones on the site before the performance begins such that the mobile phones that receiving the setting information display a wallpaper of the singer, play a key hit or even display an MTV film.

To broadcast to the targets within a specific area, a small area such as a theater, the communication system may set a low power transmitter to transmit a local broadcast signal capable of covering the specific area. After receiving the local broadcast signal, the mobile phone within the specific region transmits mobile phone information to the communication system. Following that, the system server of the communication system receives and records the mobile phone information in a registry, then broadcast the setting information to the mobile phones within the specific area according to the registry, enabling the mobile phones within the specific area to change settings according to the setting information. The low power transmitter can be installed in the base station of the system terminal; the mobile phone information can be telephone number for instance. In other words, due to the limited coverage of the signals of the low power transmitter, only mobile phone within the specific area will respond to the local broadcast signal and receive the setting information transmitted from the system terminal. As for mobile phones outside the specific area, they would not be affected at all.

Referring to FIG. 1, a flowchart of a method of changing the setting of mobile unit by broadcasting message according to the preferred embodiment of the invention is shown. The method uses existing message technology such as MMS, SMS, EMS and E-mailing to transmit specific information to achieve dynamic setting shifting. First, a broadcaster (the user or the system terminal) uses preset word-strings to encode the desired setting and time via message editing, then place the coded setting information in the header of service message to be transmitted together. If the message broadcaster would like to apply new multi-media data such as ring sounds or pictures on the setting of modes, the multi-media data can be encoded into the service message as well. The broadcaster can use the JAVA language to code the setting information into a JAVA message then have the JAVA message transmitted directly without using a service message. Next, the message broadcaster can transmit the setting information to specific mobile units by ways of telephone numbers, groups or broadcast.

The mobile unit allows the user to preset whether to activate a message-service enjoyable application (MEA) function. On receiving the header of the service message (step 112), if the MEA function is activated (determined to be "yes" in step 114), the mobile unit parses the header of the service message (step 116). The setting information carried in the header of the service message includes items such as situational setting, (silence setting or vibrating alert setting for instance), starting time, finishing time, and indication about whether exists any attached image file, ring sound, short film and so forth. After all data have been obtained (determined to be "yes" in step 118), the mobile unit determines whether the data source is valid. If the data source is eligible (determined to be "yes" in step 122), the obtained data is stored (step 124). It is determined whether the setting information is effective for a specific period of time only (determined to be "yes" in step 126), when the starting time is up, the setting information is applied (step 128, 132) and relevant functions of the setting information will be activated; meanwhile, the original setting of the mobile unit is replaced by the situational setting, such as vibrating alert setting, ring sound setting, or background pictures setting, of the setting information (step 134). When the finishing time is up, the operating mode resumes the original setting.

To the contrary, if the MEA has not yet been activated when the mobile unit receives the setting information (determined to be "no" in step 114), the mobile unit asks the user whether he or she would like to activate the MEA function (step 142). If so, the original setting of the mobile unit will be stored before proceeding to the abovementioned step of shifting operating modes (step 144); if not, the mobile unit will follow original setting without making any change.

Considering security factors, the use of MEA is sensitive to the message broadcaster or needs to be encrypted to avoid unnecessary troubles. Moreover, if a cross-platform MEA function is required, another standard MEA language (MEAL) can be established. When MEAL is implemented, the user can access the MEA function regardless of the makes or systems, bringing the benefit of MEA to a full play.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of setting an operating mode of a plurality of mobile units to a situational mode, the mobile units communicating with a communication system and selectively operating in the situational mode and an original mode, the method comprising:

broadcasting a local broadcast signal, from a low power transmitter, to make a request for information corresponding to any mobile unit within an area;

if at least one mobile unit exists within the area and receives the local broadcast signal, sending information corresponding to the at least one mobile unit to the communication system;

recording the information corresponding to the at least one mobile unit in a registry of the communication system;

transmitting a setting message to the at least one mobile unit according to the information recorded in the registry;

in response to the setting message, determining whether a message-service enjoyable application function is activated in the at least one mobile unit;

in response to the setting message, determining whether the setting message includes data corresponding to a data source which is valid;

if the message-service enjoyable application function is activated and the message includes data corresponding to a data source which is valid:

storing the setting message in the at least one mobile unit; and changing the operating mode of the at least one mobile unit from the original mode to the situational mode according to the setting message.

2. The method according to claim 1, wherein the mobile unit is a mobile phone, while the mobile unit information is a telephone number thereof.

3. The method according to claim 1, wherein the setting message is one of a short message service an electronic message service, a multi-media message service and an E-mail.

4. The method according to claim 1, wherein the setting message comprises setting information that comprises a starting time and a finishing time, and the at least one mobile unit changes the operating mode from the original mode to the situational mode on the starting time and resumes the original mode on the finishing time.

5. The method according to claim 4, wherein the setting information is stored in calendars of the mobile units.

6. The method according to claim 1, wherein the system has a base in which the low power transmitter is installed.

7. The method according to claim 4, wherein the mobile unit is a mobile phone, the original setting is incoming call rings, and the situational setting is silence.

8. The method according to claim 1, further comprising:
if the message-service enjoyable application function is not activated, requesting a user to decide whether to activate the message-service enjoyable application function; and if so, activating the message-service enjoyable application function.

9. A method of setting an operating mode of a plurality of mobile units within an area to a situational mode, the method comprising:

broadcasting a local broadcast signal covering the area, from a low power transmitter, to make a request for information corresponding to any mobile unit within the area;

if at least one mobile unit exists within the area and receives the local broadcast signal, sending information corresponding to the at least one mobile unit to the communication system;

recording the information corresponding to the at least one mobile unit in a registry of the communication system;

transmitting a setting message and a multimedia file to the at least one mobile unit according to the information recorded in the registry in order to change an operating mode of the at least one mobile unit within the area;

in response to the setting message, determining whether a message-service enjoyable application function is activated in the at least one mobile unit;

upon a condition in which the message-service enjoyable application function is activated, changing the operating mode of the at least one mobile unit from an original mode to the situational mode according to the setting message; and playing the multimedia file in the at least one mobile unit according to the setting message.

10. The method according to claim 9, wherein the setting message comprises a starting time and a finishing time;

the operating mode changing step includes changing the operating mode of the at least one mobile unit from the original mode to the situational mode on the starting time; and the method further comprising resuming the original mode of the at least one mobile unit on the finishing time.

11. The method according to claim 9, wherein the setting message comprises a starting time; and the multimedia file playing step comprising playing the multimedia file in the at least one mobile unit on the starting time.

12. The method according to claim 11, wherein the multimedia file is an image file.

13. The method according to claim 11, wherein the multimedia file is a song file.

14. The method according to claim 11, wherein the multimedia file is a video file.

* * * * *